(12) United States Patent
Bertin et al.

(10) Patent No.: US 6,346,589 B1
(45) Date of Patent: *Feb. 12, 2002

(54) POLYMERIZATION IN THE PRESENCE OF A STABLE FREE RADICAL AND OF A FREE RADICAL INITIATOR

(75) Inventors: Denis Bertin, Motteville; Bernard Boutevin, Montpellier; Pascal Nicol, Pau, all of (FR)

(73) Assignee: Elf Atochem S.A. (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,240

(22) Filed: May 9, 1997

(30) Foreign Application Priority Data

May 13, 1996 (FR) .............................................. 96 05909

(51) Int. Cl.[7] .................................................. C08F 4/34
(52) U.S. Cl. ........................ 526/220; 526/227; 526/232; 526/347; 526/347.1
(58) Field of Search ................................ 526/227, 220, 526/232, 347, 347.1

(56) References Cited

U.S. PATENT DOCUMENTS

| | | | |
|---|---|---|---|
| 3,914,339 A | * 10/1975 | Shima | |
| 4,006,283 A | * 2/1977 | MacKenzie, Jr. | ............. 526/57 |
| 4,581,429 A | 4/1986 | Solomon et al. | |
| 5,322,912 A | * 6/1994 | Georges et al. | ............. 526/204 |
| 5,344,902 A | * 9/1994 | Harwood et al. | ............ 526/227 |
| 5,401,804 A | 3/1995 | Georges et al. | |
| 5,412,047 A | 5/1995 | Georges et al. | |
| 5,449,724 A | * 9/1995 | Moffat | ......................... 526/204 |
| 5,530,079 A | * 6/1996 | Veregin | .................... 526/219.3 |
| 5,549,998 A | 8/1996 | Georges et al. | |
| 5,637,662 A | * 6/1997 | Relvini | ......................... 526/213 |
| 5,763,546 A | * 6/1998 | Jung | ........................... 525/313 |
| 5,919,871 A | 7/1999 | Nicol et al. | |
| 5,962,605 A | 10/1999 | Priddy et al. | |
| 5,990,255 A | 11/1999 | Priddy et al. | |
| 6,084,044 A | 7/2000 | Roe et al. | |

FOREIGN PATENT DOCUMENTS

| | | |
|---|---|---|
| BR | 9400671 | 10/1994 |
| EP | 0 735 051 A1 | 10/1996 |
| EP | 0735064 A1 | 10/1996 |
| WO | WO-A-95 26987 | 10/1995 |

OTHER PUBLICATIONS

Michael K. Georges et al., "Narrow Polydispersity Polystyrene by a Free–Radical Polymerization Process—Rate Enhancement," Macromolecules, vol. 27(24), Nov. 21, 1994, pp. 7228–7229.

Craig J. Hawker, "Molecular Weight Control by a 'Living' Free–Radical Polymerization Process," J. Am. Chem. Soc., vol. 116, Nov. 1994, pp. 11185–11186.

Richard P.N. Veregin et al., "Free Radical Polymerizations for Narrow Polydispersity Resins: Electron Spin Resonance Studies of the Kinetics and Mechanism," Macromolecules—Corrections, vol. 27(18), Aug. 29, 1994, p. 5238.

Richard P.N. Veregin et al., "Free Radical Polymerizations for Narrow Polydispersity Resins: Electron Spin Resonance Studies of the Kinetics and Mechanism," Macromolecules, vol. 26(20), 1993, pp. 5316–5320.

Michael K. Georges et al., "Narrow Molecular Weight Resins by a Free–Radical Polymerization Process," Macromolecules, vol. 26, Sep. 27, 1993, pp. 2987–2988.

English translation of Andrezj Bledzki; "Polymerization of Methyl Methacrylate Using Various Tetraphenylethanes"; Makromol. Chem. 184, 745–754 (1983).

Takayuki Otsu and Masatoshi Yoshida; "Role of Initiator –Transfer Agent–Terminator (Iniferter) in Radical Polymerizations: Polymer Design by Organic Disulfides as Iniferters"; Makromol Chem., Rapid Commun. 3, 127–132 (1982).

Takayuki Otsu, Masatoshi Yoshida and Toshinori Tazaki; "A Model for Living Radical Polymerization"; Makromol Chem., Rapid Commun. 3, 133–140 (1982).

* cited by examiner

Primary Examiner—Fred Zitomer
(74) Attorney, Agent, or Firm—Pennie & Edmonds LLP

(57) ABSTRACT

The invention relates to a process comprising a stage of polymerization or copolymerization of at least one polymerizable or copolymerizable monomer by a radical mechanism in the presence of a stable free radical and of an initiator of formula:

$$R^1-O-O-R^2$$

wherein $R^1$ and $R^2$, which can be identical or different, represent an alkyl, aryl, alkylaryl or aralkyl radical comprising, for example, from 1 to 20 carbon atoms. The process is fast, allows the initiator to act more efficiently and results in polymers or copolymers exhibiting a low yellowing index.

35 Claims, No Drawings

POLYMERIZATION IN THE PRESENCE OF A STABLE FREE RADICAL AND OF A FREE RADICAL INITIATOR

1. BACKGROUND OF THE INVENTION

1.1 Technical Field

The invention relates to a process for the polymerization of at least one polymerizable or copolymerizable monomer by the radical route in the presence of (1) a stable free radical and (2) a polymerization initiator.

1.2 Description of the Related Art

The presence of a stable free radical in a polymerization mixture makes it possible to control the growth of the polymer chains and generally to result in a polymer of low polydispersity, indeed with a polydispersity of approximately one, as is possible in anionic polymerization. However, the presence of the stable free radical is disadvantageous because it greatly slows down the reaction rate and makes it difficult, if not impossible, to obtain polymers with a high weight-average molecular weight, for example greater than 50,000 g/mol.

It is possible to attempt to overcome this disadvantage by adding a polymerization initiator to the polymerization. However, to date, the initiators used in mixtures comprising a polymerizable monomer and a stable free radical cause side reactions reflected by the partial destruction of the stable free radical and of the initiator itself. An additional difficulty is the formation of impurities which damage, in particular, the appearance of the final polymer. Due to these side reactions, the initiator has little effectiveness, lengthening the reaction time and making it difficult to obtain polymers with a high molecular weight. Moreover, the final polymer is colored and often opaque.

PCT Patent WO 94/11412 describes a polymerization process in the presence of a stable free radical and benzoyl peroxide as polymerization initiator. The polymers thus obtained exhibit a number-average molecular weight of less than 60,000 g/mol and a weight-average molecular weight of less than 70,000 g/mol and moreover exhibit a high yellowing index.

U.S. Pat. No. 4,581,429 describes a polymerization process which confers control on the formation of the growing polymer chains. This process requires the preparation of an alkoxyamine and results in oligomers with a molecular weight of less than 10,000 g/mol. This process also exhibits low rates of conversion of monomer to polymer.

The following references also disclose stable free radical and polymerization initiator systems: WO 95/26987, U.S. Pat. No. 5,412,047, U.S. Pat. No. 5,449,724 and BR 9400671. In these patent documents, the polymerization initiator is not regarded as an essential factor. In contrast, in the process according to the invention, the polymerization initiator is one of the novel features of the invention.

It has now been found that the use of a specific family of polymerization initiators makes it possible to overcome the above-mentioned disadvantages. The process according to the invention is fast, allows the initiator to act more effectively and results in polymers or copolymers exhibiting a low yellowing index, as determined according to ASTM standard D 1925.

2. DESCRIPTION OF THE INVENTION

The invention relates to a process comprising a stage of polymerization or copolymerization of at least one polymerizable or copolymerizable monomer by a radical route or mechanism in the presence of a stable free radical and of an initiator of formula:

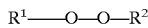

in which $R^1$ and $R^2$, which can be identical or different, represent hydrocarbon radicals comprising alkyl, such as aliphatics (straight and branched chain) and cycloaliphatics (substituted by alkyl and unsubstituted); aryl, such as aromatics; alkylaryl or aralkyl, i.e., mixed character groups. $R^1$ and $R^2$, independently, preferably comprise from 1 to 20 carbon atoms.

Preferably, at least one radical from $R^1$ and $R^2$ comprises an aromatic ring. The initiator preferably exhibits a half-life of one hour at a temperature of between 80° C. and 150° C. and, preferably, between 100° C. and 130° C.

Mention may be made, by way of example, of the following initiators:

- di-tert-butyl peroxide,
- tert-butyl cumyl peroxide,
- dicumyl peroxide. Dicumyl peroxide is a particularly suitable initiator.

The initiator can be introduced into the polymerization or copolymerization mixture in the proportion of about 50 ppm to about 50,000 ppm by weight based on the total monomer weight.

The stable free radical should not be confused with free radicals with fleeting lifetimes (a few milliseconds), such as the free radicals resulting from the usual polymerization initiators, e.g., peroxides, hydroperoxides and initiators of azo type. Free radicals which are polymerization initiators tend to accelerate the polymerization. In contrast, stable free radicals generally tend to slow down the polymerization. Within the meaning of the present invention, a stable free radical is not a polymerization initiator and the mean lifetime of the stable free radical is at least five minutes under the conditions of use of the present invention. While not wishing to be bound by any particular theory, it is thought that during this mean lifetime, the molecules of the stable free radical continually alternate between the radical state and the state of a group bonded via a covalent bond to a polymer chain. Of course, it is preferable for the stable free radical to exhibit good stability throughout the duration of its use in the context of the present invention. Generally, a stable free radical can be isolated in the radical state at room temperature.

The family of the stable free radical materials includes compounds acting as radical polymerization inhibitors and stable nitroxide radicals, i.e., comprising the =N–O· group, such as the radicals represented by the following formulae:

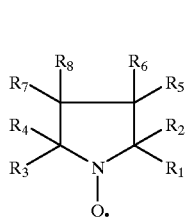 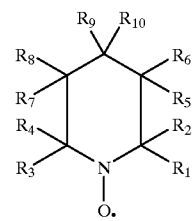

-continued

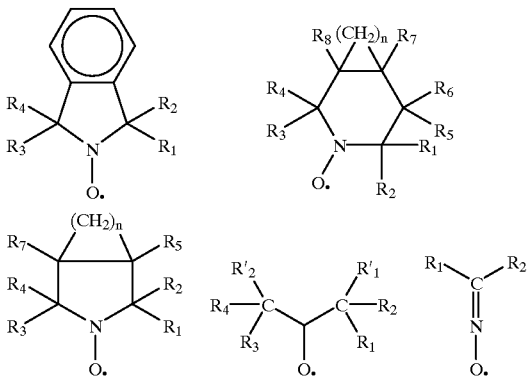

in which $R_1$, $R_2$, $R_3$, $R_4$, $R'_1$ and $R'_2$ which can be identical or different, represent a halogen atom, such as chlorine, bromine or iodine; a saturated or unsaturated, linear, branched or cyclic hydrocarbon group, such as an alkyl or phenyl radical; an ester group; an alkoxy group; a phosphonate group; or a polymer chain which can be, for example, a poly(methyl methacrylate) chain, a polybutadiene chain, a polyolefin chain, such as a polyethylene or polypropylene chain, but which is preferably a polystyrene chain, and in which $R_5$, $R_6$, $R_7$, $R_8$, $R_9$ and $R_{10}$, which can be identical or different, can be chosen from the same classes of groups just described for $R_1$, $R_2$, $R_3$, $R_4$, $R'_1$ and $R'_2$, and can furthermore represent a hydrogen atom; a hydroxyl group —OH; or an acid group such as —COOH, —PO(OH)$_2$ or —SO$_3$H, and in which n is preferably from 2 to 10 inclusive.

In particular, the stable free radical can be 2,2,5,5-tetramethyl-1-pyrrolidyloxy, sold under the trade name Proxyl, or 2,2,6,6-tetramethyl-1-piperidinyloxy, generally sold under the name Tempo.

The stable free radical can also be chosen from the following materials:
 tert-butyl 1-phenyl-2-methylpropyl nitroxide,
 tert-butyl 1-(2-naphthyl)-2-methylpropyl nitroxide,
 tert-butyl 1-diethylphosphono-2,2-dimethyl propyl nitroxide,
 tert-butyl 1-dibenzylphosphono-2,2-dimethylpropyl nitroxide,
 phenyl 1-diethylphosphono-2,2-dimethylpropyl nitroxide,
 phenyl 1-diethylphosphono-1-methylethyl nitroxide,
 1-phenyl-2-methylpropyl 1-diethylphosphono-1-methylethyl nitroxide.

The stable free radical can be introduced into the polymerization or copolymerization mixture in the proportion of about 0.005% to about 5% by weight based on the sum of the weights of polymerizable monomer and of stable free radical.

The molar ratio of the stable free radical to the initiator is preferably between about 1.5 and about 2.5 and, more preferably, approximately 2.

In the context of the present invention, any monomer exhibiting a carbon-carbon double bond capable of polymerizing or copolymerizing by the radical route can be used.

At least one monomer present in the polymerization or copolymerization mixture can be a vinylaromatic monomer, an olefin, a diene, an acrylic monomer or a methacrylic monomer. The monomer can also be vinylidene difluoride or vinyl chloride.

The term "vinylaromatic monomer" is understood to include styrene; styrene substituted on the vinyl group by at least one alkyl group and/or halogenated alkyl group, such as a-methylstyrene or a-chloromethylstyrene; styrene substituted on the phenyl ring by at least one alkyl group and/or halogenated alkyl group, such as ortho-inyltoluene, para-vinyltoluene, ortho-ethylstyrene, 2,4-dimethylstyrene or 4-chloromethylstyrene; styrene substituted on the ring by at least one halogen, such as, for example, 2,4-dichlorostyrene; vinylanthracene; and para-acetoxystyrene.

The term "diene" is understood to mean a conjugated diene comprising from 4 to 8 carbon atoms, such as 1,3-butadiene, isoprene, 2,3-dimethyl-1,3-butadiene, piperylene and chloroprene.

The process according to the invention is particularly effective for vinylaromatic monomers and for diene monomers.

Apart from the distinctive characteristics of the present invention with regard to the initiator and the stable free radical, the radical polymerization or copolymerization is carried out under conditions known to a person skilled in the art, taking into account the particular monomer or monomers under polymerization or copolymerization.

In an embodiment where the monomer mixture comprises a vinylaromatic monomer and where excellent control of the growth of the polymer or copolymer is desired so that a particularly narrow polydispersity is achieved, it is preferable to carry out the polymerization or copolymerization at a temperature at which no polymerization or copolymerization is observed in the absence of the initiator. For example, in the case of the polymerization or copolymerization of at least one vinylaromatic monomer, this condition is realized when the temperature is less than approximately 120° C. Thus, when the mixture comprises a vinylaromatic monomer, it is possible to carry out the polymerization or copolymerization between about 50° C. and about 120° C. Appreciable polymerization or copolymerization rates are nevertheless obtained by the process of the invention when the temperature is between about 90° C. and about 120° C.

Nevertheless, if a higher polydispersity is acceptable, it is possible to heat the mixture to higher temperatures. Thus, it is also possible to polymerize or copolymerize at temperatures of up to about 200° C. if a greater rate of polymerization is preferred to the detriment of the polydispersity.

The process according to the invention can be carried out between about 50° C. and about 200° C. and, preferably, between about 100° C. and about 130° C.

In an alternative embodiment, the polymer or copolymer may be an impact vinylaromatic polymer, in which case the polymerization or copolymerization mixture generally comprises at least one vinylaromatic monomer and a rubber, the latter generally formed from at least one conjugated polydiene, such as polybutadiene formed from at least one of the isomers of butadiene.

The invention also relates to the preparation of copolymers. For example, when at least one vinylaromatic monomer is present in the mixture, this monomer can be copolymerized with, for example, at least one monomer chosen from the group of consisting of acrylonitrile, methacrylonitrile, acrylic acid, methacrylic acid, an alkyl ester in which the alkyl group contains from 1 to 4 carbon atoms, an N-alkylmaleimide in which the alkyl group contains from 1 to 4 carbon atoms, and N-phenylmaleimide.

The process according to the invention makes possible the preparation of block copolymers. Indeed, the polymerization of a first monomer in the presence of a stable free radical results in a living polymer first block. It is then possible to attach to this first block a second block of another polymer by placing the first living polymer block in a mixture of a second monomer, where further polymerization occurs. Thusly, it is possible to produce block copolymers, for example, copolymers comprising one or a number of polystyrene blocks and one or a number of polybutadiene blocks. The preparation of such block copolymers by the radical route requires good control of the polymerization of each of the blocks. Indeed, if a termination reaction interrupts the polymerization of a first block, it will not be possible to attach a second block of another monomer to the first block. The termination reactions must thus be as infrequent as possible. There are fewer termination reactions when, during the polymerization, the number-average molecular weight is more closely linearly proportional to the percentage of conversion. The existence of termination reactions is reflected by a decrease in the rate of increase in the number-average molecular weight as a function of the percentage of conversion.

The process according to the invention is particularly suited to polymerization or copolymerization in the organic phase, i.e., substantially in the absence of an aqueous phase, as is the case in bulk polymerization processes or solution polymerization processes in an organic solvent.

Of course, depending on the polymerization or copolymerization conditions, for example, the duration, the temperature and the degree of conversion of monomer to polymer or copolymer, it is possible to prepare products of very different molecular weight. The invention relates to the preparation of oligomers, polymers or copolymers with a weight-average molecular weight of less than about 10,000 g/mol and to the preparation of polymers or copolymers with a weight-average molecular weight of greater than about 10,000 g/mol, such as high polymers with a weight-average molecular weight generally ranging from about 100,000 g/mol to about 400,000 g/mol.

The invention relates to polymerization or copolymerization processes in which the degree of conversion of monomer to polymer or to copolymer is less than about 50% and to those in which the degree of conversion of monomer to polymer or to copolymer is greater than about 50%. For example, the degree of conversion of monomer to polymer or to copolymer can exceed about 60% and generally ranges from about 65% to about 80%.

The process according to the invention results in a polymer, copolymer or oligomer with a polydispersity generally of less than about 1.9 and with a yellowing index, measured according to ASTM standard D 1925, of generally less than about 20, preferably less than about 10 and more preferably less than about 5.

When the molar ratio of the amount of stable free radical to the amount of monomer is greater than about 1.2, the polydispersity of the final polymer, copolymer or oligomer is generally less than about 1.5.

3. DESCRIPTION OF THE PREFERRED EMBODIMENTS

The following characteristics are used in the examples:

The % conversion is the weight % of monomer converted to polymer. It was determined by $^1$H NMR on a Bruker 200 MHz device by integrating the NMR peaks corresponding to the polymer and to the monomer.

Number-average molecular weight (hereafter "Mn") is determined by gel permeation chromatography (GPC) in tetrahydrofurane at 30° C., after calibration with standard polystyrene samples of known number-average molecular weight.

The polydispersity index (hereafter "PI") is the ratio of the weight-average molecular weight to the number-average molecular weight, both measured by GPC (i.e., see Mn above).

The efficiency is equal to the ratio of the theoretical number-average molecular weight to the experimentally determined number-average molecular weight. The theoretical number-average molecular weight is given by the formula:

$$Mn_{th} = \frac{(M)_s - (M)}{2[(I)_s - (I)]}$$

in which $(M)$, $(M)_s$, $(I)$ and $(I)_s$ represent the molar concentrations (in mol per liter) of monomer, starting monomer, initiator and starting initiator, respectively.

The concentration of initiator (I) as a function of the time (t) is determined by the equation:

$$(I) = (I)_s e^{-K_d \cdot t}$$

in which $K_d$ represents the rate constant for decomposition of the initiator at the temperature under consideration.

The closer that the efficiency value approaches 1, the more effective the initiator and the stable free radical are in acting to control the polymerization and the less they participate in the undesirable side reactions, which partially destroy them and reduce their effectiveness.

EXAMPLES 1 to 7

A 100 ml two-necked reactor equipped with a stirrer system and with a temperature controlling mechanism was purged by alternating vacuum and nitrogen cycles. The following materials were then introduced into the reactor under nitrogen and at room temperature:

50 g of styrene (0.481 mol);

an amount of initiator such that the molar ratio of the initiator to the styrene is equal to $C_{INITIALTOR}$, the value of which is shown in the headings of Tables 1 to 7 ($C_{DICUM}$ when the initiator used was dicumyl peroxide and $C_{BENZ}$ when the initiator used was, for comparative examples 2 and 4, benzoyl peroxide); and an amount of 2,2,6,6-tetramethylpiperidinyloxy (commonly known as Tempo) such that the molar ratio of the Tempo to the initiator is 2.

The reactor was then brought to 125° C. with stirring and maintained at that temperature until the reaction mixture set solidly. The moment at which the mixture reached the temperature of 125° C. is defined as being the starting point of the test.

The solid polymer was then cooled to room temperature and dissolved in 10 times its weight of tetrahydrofuran (THF). The polymer was then precipitated by pouring the THF solution, dropwise, into 10 times its volume of methanol. The polystyrene collected was analyzed by gel permeation chromatography (GPC). The results are collected in Tables 1 to 7.

These results show the change in the formation of the polymer as a function of the time.

EXAMPLE 8

After purging by vacuum/nitrogen cycles, 300 g of styrene, 4.5 millimole of dicumyl peroxide and millimole of stable free radical Tempo are introduced, at 20° C. and under nitrogen, into a 1-liter glass reactor equipped with an anchor stirrer and with a temperature controlling mechanism. The combined mixture is brought to 125° C. The moment at which the mixture reaches the temperature of 125° C. is defined as being the starting point of the test. Samples are withdrawn over time for analysis. The results relating to the monitoring of the formation of the polymer over time are given in Table 8.

The polymer obtained after polymerizing for 5.5 hours is then degassed in an oven under a vacuum, with a residual pressure of 25 mbar, for 20 minutes at 200° C. It is then shaped into a slab with a thickness of 3 mm in a press by a process comprising preheating the material at atmospheric pressure for 5 minutes while the temperature is increased from room temperature to 170° C. and then pressing for 5 minutes at 170° C. under 200 bars pressure. After the pressure was released and the slab was cooled to room temperature, the yellowing index was measured on the slab, according to ASTM standard D 1925. The yellowing index was found to be 2.

EXAMPLE 9 (Comparative)

The reaction was carried out in the way described in Example 8, except that dicumyl peroxide was replaced by the same amount of benzoyl peroxide. The results relating to the monitoring of the formation of the polymer over time are given in Table 9. The yellowing index was found to be 34.9.

TABLE 1

EXAMPLE 1; $C_{DICUM} = 0.02$

| Time (h) | % Conversion | Mn Measured | PI | Efficiency |
|---|---|---|---|---|
| 1 | 2 | 300 | 1.05 | |
| 5 | 4 | 300 | 1.05 | |
| 10 | 5 | 300 | 1.05 | |
| 12 | 5 | 300 | 1.05 | |
| 15 | 7 | 300 | 1.05 | |
| 16 | 10 | 300 | 1.05 | |
| 17 | 25 | 650 | 1.07 | |
| 18 | 35 | 700 | 1.09 | 1.1 |
| 19 | 45 | 960 | 1.12 | 1.1 |
| 20 | 50 | 1050 | 1.12 | 1.1 |
| 21 | 55 | 1100 | 1.13 | |
| 22 | 60 | 1200 | 1.13 | 1.1 |
| 23.75 | 60 | 1300 | 1.14 | 1 |
| 26 | 60 | 1400 | 1.15 | 1 |

TABLE 2

EXAMPLE 2 (COMPARATIVE); $C_{BENZ} = 0.02$

| Time (h) | % Conversion | Mn Measured | PI | Efficiency |
|---|---|---|---|---|
| 3.5 | 7.4 | — | — | |
| 5 | 8 | — | — | |
| 9 | 9 | — | — | |
| 14 | 12.5 | — | — | |
| 18 | 16.4 | 560 | 1.11 | |
| 22 | 20 | — | — | |
| 27 | 28 | 1500 | 1.11 | 0.5 |
| 32 | 32 | — | | |
| 38 | 37 | 1750 | 1.15 | 0.5 |
| 44 | 42 | 2200 | 1.16 | 0.5 |
| 51 | 45 | 2200 | — | |
| 58 | 47 | 2200 | 1.22 | 0.5 |
| 65 | 49 | 2200 | 1.32 | 0.5 |
| 74 | 50 | 2200 | 1.32 | 0.6 |

TABLE 3

EXAMPLE 3; $C_{DICUM} = 0.01$

| Time (h) | % Conversion | Mn Measured | PI | Efficiency |
|---|---|---|---|---|
| 1 | 2 | 300 | 1.00 | |
| 3 | 2.5 | 300 | 1.00 | |
| 5 | 3 | 300 | 1.00 | |
| 7 | 4 | 300 | 1.00 | |
| 9 | 6 | 300 | 1.00 | |
| 10 | 8 | 300 | 1.00 | |
| 11 | 9 | 300 | 1.00 | |
| 12 | 10 | 300 | 1.00 | |
| 13 | 11 | 300 | 1.00 | |
| 14 | 12 | 300 | 1.00 | |
| 15 | 13 | 300 | 1.00 | |
| 16 | 15 | 450 | 1.05 | |
| 17 | 50 | 2200 | 1.3 | 1.1 |
| 18 | 78 | 3600 | 1.26 | 1.1 |
| 18.5 | 90.5 | 4200 | 1.23 | 1.1 |

TABLE 4

EXAMPLE 4 (COMPARATIVE); $C_{BENZ} = 0.01$

| Time (h) | % Conversion | Mn Measured | PI | Efficiency |
|---|---|---|---|---|
| 3.5 | 3 | — | — | |
| 5 | 5 | — | — | |
| 11 | 12 | 450 | 1.07 | |
| 21 | 24 | 2200 | 1.14 | 0.6 |
| 24 | 31 | 2600 | 1.16 | 0.6 |
| 28 | 37 | 2700 | 1.27 | 0.7 |
| 31 | 43 | 3100 | 1.22 | |
| 34 | 44 | 3350 | 1.15 | 0.7 |
| 37 | 47 | 3600 | 1.20 | 0.7 |
| 42 | 57 | 4200 | 1.20 | 0.7 |
| 47 | 63 | | — | |
| 51 | 67 | 4300 | 1.23 | 0.8 |
| 55 | 78 | 4650 | 1.23 | 0.9 |
| 61 | 90 | 5000 | 1.23 | 1 |

TABLE 5

EXAMPLE 5; $C_{DICUM} = 0.00125$

| Time (h) | % Conversion | Mn Measured | PI | Efficiency |
|---|---|---|---|---|
| 4 | 1.5 | 300 | 1.00 | |
| 6 | 2.5 | 300 | 1.00 | |
| 10 | 38 | 12,600 | 1.4 | |
| 11 | 54 | 16,700 | 1.4 | |
| 11.75 | 68 | 21,800 | 1.4 | |
| 13 | 81 | 29,000 | 1.34 | 1.1 |

TABLE 6

EXAMPLE 6; $C_{DICUM} = 0.0005$

| Time (h) | % Conversion | Mn Measured | PI | Efficiency |
|---|---|---|---|---|
| 3 | 1.5 | 300 | | |
| 4 | 2 | 300 | | |
| 5 | 7.5 | 11,000 | 1.7 | 0.7 |
| 6 | 22 | 21,200 | 1.71 | 1 |
| 7 | 31 | 30,000 | 1.63 | 1 |
| 8 | 41 | 39,400 | 1.57 | 1 |
| 9 | 50.8 | 47,000 | 1.54 | 1 |
| 10 | 60 | 54,000 | 1.56 | 1.1 |

TABLE 6-continued

EXAMPLE 6; $C_{DICUM} = 0.0005$

| Time (h) | % Conversion | Mn Measured | PI | Efficiency |
|---|---|---|---|---|
| 11 | 71 | 66,000 | 1.53 | 1.1 |

TABLE 7

EXAMPLE 7; $C_{DICUM} = 0.000166$

| Time (h) | % Conversion | Mn Measured | PI |
|---|---|---|---|
| 1 | 1 | 300 | |
| 3 | 9 | 33,600 | 1.8 |
| 4 | 25 | 66,000 | 1.6 |
| 5 | 40 | 76,000 | 1.6 |
| 6.5 | 63 | 104,000 | 1.6 |

TABLE 8

EXAMPLE 8; $C_{DICUM} = 0.0026$

| Time (h) | % Conversion | Mn Measured | PI |
|---|---|---|---|
| 1 | 0.2 | | |
| 4 | 52.6 | 10,600 | 1.4 |
| 5 | 71.2 | 14,170 | 1.3 |
| 5.5 | 85 | 15,400 | 1.3 |

TABLE 9

EXAMPLE 9 (COMPARATIVE); $C_{BENZ} = 0.0026$

| Time (h) | % Conversion | Mn Measured | PI |
|---|---|---|---|
| 1 | 1.2 | | |
| 5 | 22.6 | | |
| 5.5 | 28 | 6141 | 1.2 |
| 8.5 | 49.9 | 10,950 | 1.3 |
| 11 | 63 | 13,320 | 1.3 |

What is claimed is:

1. A process for manufacturing a polymer or copolymer material comprising polymerizing or copolymerizing in an organic phase substantially in the absence of an aqueous phase at least one monomer by a radical mechanism in the presence of (1) a stable nitroxide free radical and (2) from about 50 ppm to about 50,000 ppm by weight based on the weight of monomer of an initiator selected from the group consisting of di-tert-butyl peroxide, tert-butyl cumyl peroxide and dicumyl peroxide wherein the stable free radical is introduced in a proportion of about 0.005% to about 5% by weight based on the sum of the weight of monomer and the stable free radical, wherein the polydispersity of the polymer or copolymer material is less than about 1.9 and wherein the polymer or copolymer material has a yellowing index measured according to ASTM standard D 1925 of less than about 20.

2. The process according to claim 1, further comprising selecting dicumyl peroxide as the initiator.

3. The process according to claim 1, further comprising choosing the molar ratio of the stable free radical to the initiator to be between about 1.5 and about 2.5.

4. The process according to claim 1, further comprising selecting at least one monomer to be vinylaromatic.

5. The process according to claim 1, further comprising selecting at least one monomer to be a diene.

6. The process according to claim 1, further comprising conducting the polymerization or copolymerization over a temperature range from about 100° C. to about 130° C.

7. The process according to claim 1, further comprising conducting the polymerization or copolymerization such that the degree of conversion of monomer to polymer is greater than about 50%.

8. The process according to claim 7, further comprising conducting the polymerization or copolymerization such that the degree of conversion is greater than about 60%.

9. The process according to claim 8, further comprising conducting the polymerization or copolymerization such that the degree of conversion ranges from about 65% to about 80%.

10. The process according to claim 1, further comprising choosing the molar ratio of the amount of stable free radical to the amount of monomer to be greater than about 1.2.

11. A polymer or copolymer material manufactured by the process according to claim 1, comprising polymerizing or copolymerizing at least one monomer by a radical mechanism, wherein the material has a weight-average molecular weight greater than about 50,000 g/mol.

12. The polymer or copolymer material according to claim 11, wherein the yellowing index is less than about 10.

13. The polymer or copolymer material according to claim 12, wherein the yellowing index is less than about 5.

14. The polymer or copolymer material according to claim 11, wherein the polydispersity is less than about 1.5.

15. The polymer or copolymer material according to claim 11, wherein the material comprises at least one vinylaromatic monomer.

16. The process for manufacturing a polymer or copolymer material according to claim 1, wherein the polymerization or copolymerization mixture consists of:
at least one vinylaromatic monomer;
the stable free radical;
the initiator;
optionally, at least one rubber; and
optionally, at least one solvent.

17. The process according to claim 16, wherein the polymer or copolymer is an impact vinylaromatic polymer and wherein the polymerization or copolymerization mixture comprises a rubber.

18. The process according to claim 17, further comprising selecting the initiator from the group consisting of tert-butyl cumyl peroxide and dicumyl peroxide.

19. The process of claim 1, wherein the yellowing index is less than about 10.

20. The process of claim 19, wherein the yellowing index is less than about 5.

21. The process of claim 16, wherein the yellowing index is less than about 10.

22. The process of claim 21, wherein the yellowing index is less than about 5.

23. The polymer or copolymer material according to claim 11, wherein the polymerization or copolymerization is conducted such that the degree of conversation of monomer to polymer is greater than about 50%.

24. The polymer or copolymer material according to claim 23, wherein the polymerization or copolymerization is conducted such that the degree of conversion is greater than about 60%.

25. The polymer or copolymer material according to claim 13, wherein the weight-average molecular weight of the material is from about 100,000 g/mol to about 400,000 g/mol.

26. The polymer or copolymer material according to claim 25, wherein the material comprises at least one vinylaromatic monomer.

27. The process according to claim 1, further comprising conducting the polymerization or copolymerization such that the degree of conversion is greater than about 60%.

28. The process according to claim 27, wherein the yellowing index, measured according to ASTM D 1925, is less than about 5.

29. The process according to claim 27, wherein the polymer or copolymer material is an impact vinylaromatic polymer and wherein the polymerization or copolymerization mixture consists essentially of:

at least one vinylaromatic monomer;

the stable free radical;

the initiator;

a rubber; and optionally, a solvent.

30. The process according to claim 1, wherein the monomer or monomers are selected from the group consisting of a vinylaromatic monomer, a diene, an acrylic monomer, a methacrylic monomer, vinylidene difluoride, vinyl chloride, and mixtures thereof and, if a vinylaromatic monomer is present in the polymer or copolymer, the group optionally includes acrylonitrile, methacrylonitrile, acrylic acid, methacrylic acid, an alkyl ester wherein the alkyl group contains from 1 to 4 carbon atoms, an N-alkylmaleimide wherein the alkyl group contains from 1 to 4 carbon atoms, and N-phenylmaleimide.

31. The process according to claim 1, wherein the polymerization or copolymerization mixture comprises a vinylaromatic monomer and at least one second monomer different from the vinylaromatic monomer wherein the second monomer is selected from the group consisting of a vinylaromatic monomer, acrylonitrile, methacrylonitrile, acrylic acid, methacrylic acid, an alkyl ester wherein the alkyl group contains from 1 to 4 carbon atoms, an N-alkylmaleimide wherein the alkyl group contains from 1 to 4 carbon atoms, and N-phenylmaleimide.

32. The polymer or copolymer material according to claim 14, wherein the yellowing index is less than about 5.

33. The polymer or copolymer material according to claim 32, wherein the monomer or monomers are selected from the group consisting of vinylaromatic monomers.

34. The polymer or copolymer material according to claim 32, wherein the monomer or monomers are selected from the group consisting of a vinylaromatic monomer, a diene, an acrylic monomer, a methacrylic monomer, vinylidene difluoride, vinyl chloride, and mixtures thereof and, if a vinylaromatic monomer is present in the polymer or copolymer, the group optionally includes acrylonitrile, methacrylonitrile, acrylic acid, methacrylic acid, an alkyl ester wherein the alkyl group contains from 1 to 4 carbon atoms, an N-alkylmaleimide wherein the alkyl group contains from 1 to 4 carbon atoms, and N-phenylmaleimide.

35. The polymer or copolymer material according to claim 33, wherein the polymerization or copolymerization mixture comprises a vinylaromatic monomer and at least one second monomer different from the vinylaromatic monomer wherein the second monomer is selected from the group consisting of a vinylaromatic monomer, acrylonitrile, methacrylonitrile, acrylic acid, methacrylic acid, an alkyl ester wherein the alkyl group contains from 1 to 4 carbon atoms, an N-alkylmaleimide wherein the alkyl group contains from 1 to 4 carbon atoms, and N-phenylmaleimide.

\* \* \* \* \*